United States Patent
Beer et al.

[11] Patent Number: 5,883,021
[45] Date of Patent: Mar. 16, 1999

[54] GLASS MONOFILAMENT AND STRAND MATS, VACUUM-MOLDED THERMOSET COMPOSITES REINFORCED WITH THE SAME AND METHODS FOR MAKING THE SAME

[75] Inventors: Kenneth D. Beer, Vandergrift; Jian Meng, Pittsburgh; Thomas P. Unites, Library, all of Pa.

[73] Assignee: PPG Industries, Inc., Pittsburgh, Pa.

[21] Appl. No.: 984,479

[22] Filed: Dec. 1, 1997

Related U.S. Application Data

[63] Continuation-in-part of Ser. No. 828,212, Mar. 21, 1997.
[51] Int. Cl.$^6$ .................................................. B04D 1/00
[52] U.S. Cl. ........................... 442/172; 442/66; 442/108; 428/378; 428/380; 428/392; 428/401; 162/149; 156/180; 156/349; 427/212; 427/214; 427/294; 427/292
[58] Field of Search ................................ 442/66, 108, 172; 428/378, 380, 392, 401; 162/149; 156/180, 349; 427/212, 214, 294, 292

[56] References Cited

U.S. PATENT DOCUMENTS

| | | | |
|---|---|---|---|
| 3,544,414 | 12/1970 | Simison | 156/369 |
| 3,614,936 | 10/1971 | Phillipps | 112/420 |
| 3,664,909 | 5/1972 | Ackley | 161/141 |
| 3,713,962 | 1/1973 | Ackley | 161/154 |
| 3,772,739 | 11/1973 | Lovgren | 19/156.3 |
| 3,850,723 | 11/1974 | Ackley | 156/180 |
| 3,889,035 | 6/1975 | Jakes | 428/227 |
| 4,112,174 | 9/1978 | Hannes et al. | 428/220 |

(List continued on next page.)

FOREIGN PATENT DOCUMENTS

| | | |
|---|---|---|
| 329255 | 5/1994 | European Pat. Off. . |
| 0745716 | 12/1996 | European Pat. Off. . |
| 3321006 | 12/1996 | Germany . |
| 60208243 | 2/1982 | Japan . |
| 6248550 | 9/1994 | Japan . |
| 816305 | 2/1996 | Japan . |
| 95075846 | 2/1996 | Japan . |
| 666591 | 2/1952 | United Kingdom . |
| 2104559 | 3/1983 | United Kingdom . |
| 2180562 | 4/1987 | United Kingdom . |
| 1443754 | 2/1996 | United Kingdom . |
| 92/04491 | 3/1992 | WIPO . |

OTHER PUBLICATIONS

"Waste Fiber Glass Mat," Research Disclosure 38713 (Jul. 1996) at p. 409.
U.S. application No. 08/787,735.
K. Lowenstein, *The Manufacturing Technology of Glass Fibers*, (3rd Ed. 1993) at pp. 22–27, 30–44, 47–60, 115–122, 119–151, 126–135, 165–173, 219–222, 237–291, 315.
*Encyclopedia of Polymer Science and Technology*, vol. 6(1967) at pp. 505–712.
"From Bale to Nonwoven Web in One Continuous Operation," a publication of Rando Machine Corp. (Sep. 1990) at pp. 4–5.
Rando–Web Process, a publication of Rando Machine Corp.

*Primary Examiner*—Richard Weisberger
*Attorney, Agent, or Firm*—Ann Marie Cannoni

[57] ABSTRACT

A vacuum molding-compatible mat including about 10 weight percent to about 99 weight percent glass monofilaments having a mean average length ranging from about 5 to about 150 millimeters and coated with a filament coating composition which is compatible with a thermosetting matrix material for forming a vacuum molded composite; and glass fiber strands having a mean average length ranging from about 5 to about 150 millimeters and coated with a strand coating composition which is compatible with the thermosetting matrix material for forming the vacuum molded composite; wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands.

24 Claims, 4 Drawing Sheets

U.S. PATENT DOCUMENTS

| | | | |
|---|---|---|---|
| 4,129,674 | 12/1978 | Hannes et al. | 428/285 |
| 4,277,531 | 7/1981 | Picone | 428/228 |
| 4,390,336 | 6/1983 | Ziegler | 425/82 |
| 4,466,819 | 8/1984 | Dunn | 65/463 |
| 4,547,421 | 10/1985 | Dunbar | 428/285 |
| 4,600,423 | 7/1986 | Stotler et al. | 65/458 |
| 4,390,336 | 6/1983 | Ziegler | 425/82 |
| 4,466,819 | 8/1984 | Dunn | 65/463 |
| 4,547,421 | 10/1985 | Dunbar | 428/285 |
| 4,600,423 | 7/1986 | Stotler et al. | 65/458 |
| 4,601,741 | 7/1986 | Stotler et al. | 65/458 |
| 4,640,810 | 2/1987 | Laursen et al. | 264/518 |
| 4,749,613 | 6/1988 | Yamada et al. | 428/286 |
| 4,847,140 | 7/1989 | Jakowski | 428/220 |
| 4,886,701 | 12/1989 | Ehnert et al. | 428/282 |
| 4,902,215 | 2/1990 | Seeman | 425/406 |
| 4,921,659 | 5/1990 | Marshall et al. | 264/510 |
| 4,931,357 | 6/1990 | Marshall et al. | 428/284 |
| 4,931,358 | 6/1990 | Wahl et al. | 428/285 |
| 4,948,661 | 8/1990 | Smith et al. | 428/286 |
| 4,952,128 | 8/1990 | Marshall et al. | 425/82 |
| 5,011,737 | 4/1991 | Smith et al. | 428/409 |
| 5,014,396 | 5/1991 | Nieminen | 19/205 |
| 5,052,906 | 10/1991 | Seemann | 425/112 |
| 5,071,608 | 12/1991 | Smith et al. | 264/119 |
| 5,098,624 | 3/1992 | Smith et al. | 264/119 |
| 5,108,678 | 4/1992 | Hirasaka et al. | 264/113 |
| 5,129,131 | 7/1992 | Kimura et al. | 28/107 |
| 5,194,462 | 3/1993 | Hirsaka et al. | 524/13 |
| 5,316,462 | 5/1994 | Seemann | 425/112 |
| 5,380,580 | 1/1995 | Rogers et al. | 428/219 |
| 5,437,928 | 8/1995 | Thimons et al. | 428/391 |
| 5,441,590 | 8/1995 | Ihm et al. | 156/148 |
| 5,540,986 | 7/1996 | Kimura et al. | 428/285 |
| 5,565,049 | 10/1996 | Simmons et al. | 156/62.5 |
| 5,571,610 | 11/1996 | Loftus et al. | 428/285 |
| 5,580,646 | 12/1996 | Jansz et al. | 428/228 |

GLASS MONOFILAMENT AND STRAND MATS, VACUUM-MOLDED THERMOSET COMPOSITES REINFORCED WITH THE SAME AND METHODS FOR MAKING THE SAME

CROSS REFERENCE TO RELATED APPLICATIONS

This is a continuation-in-part of U.S. patent application Ser. No. 08/828,212, entitled "Glass Monofilament and Strand Mats, Thermoplastic Composites Reinforced with the Same and Methods for Making the Same" of E. Martine et al., filed Mar. 21, 1997 pending.

FIELD OF THE INVENTION

This invention relates generally to glass fiber mats, vacuum-molded thermoset composites reinforced with the same and methods for making the same. More particularly, this invention relates to entangled mats of generally uniformly dispersed glass monofilaments and strands which are compatible with thermoset vacuum molding processes.

BACKGROUND OF THE INVENTION

The physical characteristics of a composite, such as flexibility, strength and glass content, are greatly influenced by the configuration and type of reinforcement. Preferred reinforcement configurations often vary greatly for different molding processes, molding conditions and matrix materials. For example, reinforcements typically used for reinforcing thermoplastic matrix materials may not be compatible with thermosetting molding operations. In thermosetting molding operations, good "wet-through" (penetration of the polymeric matrix material through the mat) and "wet-out" (penetration of the polymeric matrix material through the individual bundles or strands of fibers in the mat) properties are desirable. In contrast, good dispersion properties are of predominant concern in typical thermoplastic molding operations.

For reinforcing a resin matrix material, U.S. Pat. Nos. 3,664,909, 3,713,962 and 3,850,723 disclose fibrous mats of unstranded filaments which can be layered with reinforcing mats of fiber strands.

U.S. Pat. Nos. 4,948,661, 5,011,737, 5,071,608 and 5,098,624 disclose fiber reinforced thermoplastic molded products produced by intimately blending reinforcing glass fibers and thermoplastic fibers into a web and heating the web to the melting point of the thermoplastic fibers while applying pressure to the web to press the web into a consolidated structure.

U.S. Pat. No. 4,112,174 and 4,129,674 disclose a carrier mat useful in the manufacture of roofing materials which includes a web of randomly dispersed monofilament glass fibers, elongated glass fiber bundles and a binder such as urea-formaldehyde for consolidating the mat.

British Patent Application No. 2 104 559 discloses a web, tissue or mat of continuous glass filament yarn entangled with glass fiber monofilaments and coated with a resin bonding agent which is useful for reinforcing plastic moldings.

U.S. Pat. Nos. 5,108,678 and 5,194,462 disclose a fiber reinforced plastic sheet having a gradient layer structure wherein less opened strands are concentrated in the lower layers and more opened strands are concentrated in the upper layers of the structure.

The foregoing references do not adequately address the challenges of thermoset vacuum molding processes, in which there is a long-felt need for a glass fiber reinforcement which is compatible with thermosetting matrix materials and which provides composites having good surface characteristics such as hydrolysis and ultraviolet radiation resistance and physical properties such as stiffness and strength.

SUMMARY OF THE INVENTION

One aspect of the present invention is a vacuum molding-compatible mat adapted to reinforce a thermosetting matrix material in a vacuum molded composite, the mat comprising: (a) a plurality of glass monofilaments present in an amount ranging from at least about 10 weight percent to about 99 weight percent of the mat on a total solids basis, the plurality of glass monofilaments having a mean average length ranging from about 5 to about 150 millimeters and having a filament coating composition applied to at least a portion of surfaces of the glass monofilaments, the filament coating composition being compatible with a thermosetting matrix material for forming a vacuum molded composite; and (b) a plurality of glass fiber strands, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the thermosetting matrix material for forming the vacuum molded composite; wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands.

Another aspect of the present invention is a reinforced polymeric vacuum molded composite comprising: (a) a vacuum moldable thermosetting matrix material; and (b) a reinforcing mat comprising: (1) a plurality of glass monofilaments present in an amount ranging from at least about 10 weight percent to about 99 weight percent of the mat on a total solids basis, the plurality of glass monofilaments having a mean average length ranging from about 5 to about 150 millimeters and having a filament coating composition applied to at least a portion of surfaces of the glass monofilaments, the filament coating composition being compatible with a vacuum moldable thermosetting matrix material for forming a vacuum molded composite; and (2) a plurality of glass fiber strands, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the vacuum moldable thermosetting matrix material for forming the vacuum molded composite; wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands.

Yet another aspect of the present invention is a method for making a mat adapted to reinforce a vacuum moldable thermosetting matrix material in a vacuum molded composite, the method comprising the steps of: (a) mixing a plurality of glass monofilaments with a plurality of glass fiber strands to form an essentially uniform mixture, the glass monofilaments comprising about 10 to about 99 weight percent of the mixture on a total solids basis, the glass monofilaments having a mean average length ranging from about 5 to about 150 millimeters and having a filament coating composition applied to at least a portion of surfaces of the glass monofilaments, the filament coating composition being compatible with a vacuum moldable thermosetting matrix material for forming a vacuum molded composite, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the vacuum moldable thermosetting matrix material for forming the vacuum molded composite; (b) dispensing the mixture onto a collector to form a mat having a mat surface weight greater than about 200 grams per square meter; and (c) entangling the glass monofilaments with the glass fiber strands of the mat.

Another aspect of the present invention is a method for reinforcing a vacuum moldable thermosetting matrix material to form a vacuum molded composite, the method comprising the steps of: (a) coating and impregnating at least a portion of a reinforcing mat with a vacuum moldable thermosetting matrix material by applying a vacuum to a side of the reinforcing mat opposite a supply of vacuum moldable thermosetting matrix material to distribute the thermosetting matrix material essentially uniformly throughout the reinforcing mat, the reinforcing mat comprising: (1) a plurality of glass monofilaments present in an amount ranging from at least about 10 weight percent to about 99 weight percent of the mat on a total solids basis, the plurality of glass monofilaments having a mean average length ranging from about 5 to about 150 millimeters and having a filament coating composition applied to at least a portion of surfaces of the glass monofilaments, the filament coating composition being compatible with the vacuum moldable thermosetting matrix material for forming a vacuum molded composite; and (2) a plurality of glass fiber strands, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the vacuum moldable thermosetting matrix material for forming the vacuum molded composite; wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands; and (b) at least partially curing the thermosetting matrix material to form a reinforced composite.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

The mats of the present invention are useful for reinforcing thermosetting matrix materials to form vacuum molded composites for such applications as boat hulls, light poles, utility poles and support pilings. The mats of the present invention can be used as a single ply, but preferably are used in multiple plies to provide stiffness and thickness to a composite or as a surface layer in combination with reinforcement mats and/or fabrics to form a composite having a resin-rich surface which provides good hydrolysis and ultraviolet radiation resistance.

Vacuum-molded thermoset composites fabricated from the mats of the present invention exhibit good surface characteristics, such as smoothness and few surface voids, as well as good mechanical properties, such as stiffness and modulus.

Figure 1:
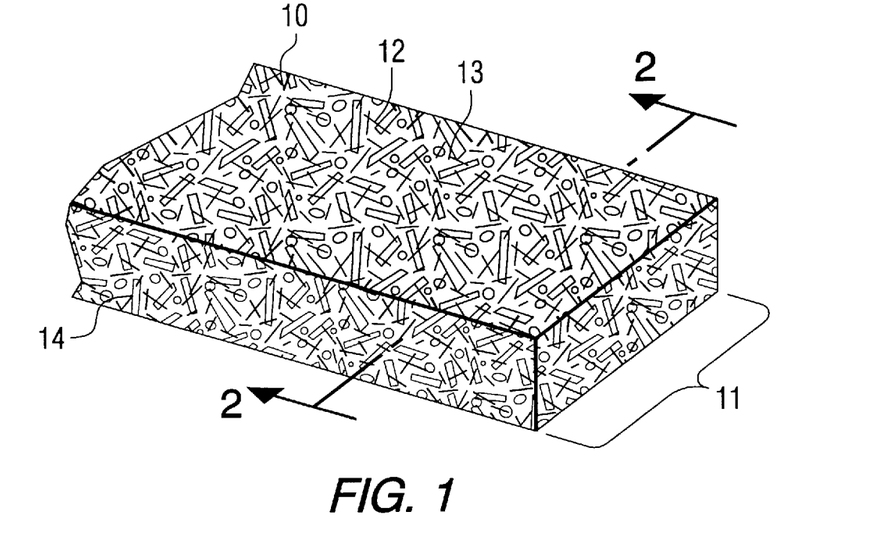
FIG. 1 is an enlarged schematic perspective view of a portion of a mat according to the present invention.
Figure 2:
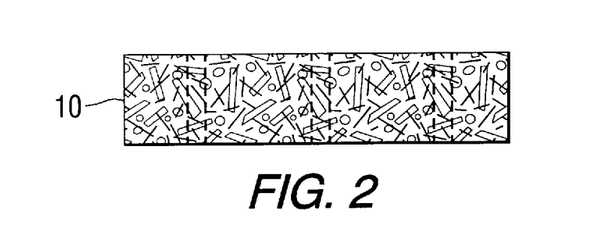
FIG. 2 is a cross sectional view of the mat of FIG. 1, taken along lines 2—2 of FIG. 1.

Referring to the drawings, wherein like numerals indicate like elements throughout, there is shown in FIGS. 1 and 2 a preferred embodiment of a mat, generally designated 10, in accordance with the present invention.

As shown in FIGS. 1 and 2, the mat 10 comprises a plurality of generally uniformly distributed, randomly oriented glass monofilaments 12 and glass fiber strands 14. As used herein, the term "monofilaments" means a plurality of individual filaments or fibers. The term "strand" as used herein refers to a plurality of filaments or fibers which are present in generally parallel cohesive bundles which resist separation of the adjacent filaments of the respective bundle. Each glass fiber strand 14 preferably comprises at least about 100 generally parallel glass filaments and more preferably about 200 to about 800 filaments.

As used herein, the phrase "randomly oriented" means that the glass monofilaments 12 and strands 14 (discussed below) of the mat 10 are randomly oriented in three dimensions, as shown in FIG. 1. Apparatus and methods for forming the mat 10 will be discussed in detail below.

The glass monofilaments 12 and glass fiber strands 14 are formed from glass filaments, a class of filaments generally accepted to be based upon oxide compositions such as silicates selectively modified with other oxide and non-oxide compositions. Useful glass filaments can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass filaments are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Continuous Glass Fibres*, (3d Ed. 1993) at pages 30–44, 47–60, 115–122 and 126–135, which are hereby incorporated by reference.

The glass filaments can have a nominal filament diameter ranging from about 5.0 to about 24.0 micrometers (corresponding to a filament designation of D through U), and preferably have a nominal filament diameter ranging from about 13.0 to about 23.0 micrometers (K through T). For further information regarding nominal filament diameters and designations of glass filaments, see *Loewenstein* at page 25, which is hereby incorporated by reference.

The phrase "discontinuous" means that the plurality of glass monofilaments 12 have a mean average length ranging from about 5 to about 150 millimeters, preferably about 10 to about 75 millimeters, and more preferably about 25 to about 50 millimeters and that the plurality of glass fiber strands 14 have a mean average length ranging from about 5 to about 150 millimeters, preferably about 10 to about 75 millimeters, and more preferably about 25 to about 50 millimeters.

The glass monofilaments 12 are present in an amount ranging from at least about 10 weight percent to about 99 weight percent of the mat on a total solids basis. Preferably, the glass monofilaments 12 are present in an amount ranging from about 30 weight percent to about 99 weight percent, more preferably about 40 to about 90 weight percent and, even more preferably, about 50 weight percent to about 70 weight percent of the mat on a total solids basis. The glass fiber strands 14 are present in a amount ranging from about 1 to about 70 weight percent of the mat on a total solids basis, preferably about 10 to about 60 weight percent and more preferably about 30 to about 50 weight percent.

The glass monofilaments 12 have a filament coating composition applied to at least a portion of surfaces of the glass monofilaments 12, preferably as an essentially dried residue. The glass fiber strands 14 have a strand coating composition applied to at least a portion of surfaces of the glass fiber strands, also preferably as an essentially dried residue. Both the filament coating composition and the strand coating composition are compatible with the thermosetting matrix material 16, which is selected to be compatible with vacuum molding processes.

The filament coating composition preferably has the same components and/or amounts of components as the strand coating composition. Alternatively, the components and/or amounts of components of the filament coating composition can be different from the strand coating composition.

Non-limiting examples of suitable coating compositions include sizing compositions and secondary coating compositions. As used herein, the terms "size", "sized" or "sizing" refer to the aqueous composition applied to the filaments immediately after formation. The term "secondary coating" refers to a coating composition applied secondarily to one or a plurality of strands after the sizing composition is applied, and preferably at least partially dried.

As used herein, the phrase "compatible with the thermosetting matrix material" means that the components of the coating compositions facilitate wetting of the matrix material upon the filaments and/or fiber strands and provide adequate physical properties in the vacuum-molded composite.

The sizing composition preferably comprises one or more polymeric film forming materials which are compatible with the thermosetting matrix material. Suitable polymeric film-forming materials include one or more thermosetting materials, one or more vinyl acetate materials, one or more thermoplastic polyester materials, and mixtures thereof.

Examples of suitable thermosetting film-forming materials include aminoplasts, alkyds, phenolics, polyepoxides, thermosetting polyesters, thermosetting polyurethanes, vinyl polymers, derivatives, copolymers and mixtures thereof.

Useful aminoplasts include urea-formaldehydes and melamine formaldehydes such as RESIMENE 841 which is commercially available from Monsanto Co. of St. Louis, Mo. A non-limiting example of a phenolic suitable for use in the present invention is phenol formaldehyde.

Useful polyepoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. An example of a suitable commercially available epoxy film-forming polymer is EPON® 880 epoxy resin, which is an epoxy functional polyglycidyl ether of bisphenol A prepared from bisphenol-A and epichlorohydrin and is commercially available from Shell Chemical Company of Houston, Tex.

Suitable thermosetting polyurethanes include BAYBOND XW-110, which is commercially available from Bayer Corp. of Pittsburgh, Pa. and other thermosetting polyurethanes which are commercially available from Bayer and E.I. duPont de Nemours Co. of Wilmington, Del.

A preferred thermosetting polyester material is RD-847A polyester resin which is commercially available from Borden Chemicals of Columbus, Ohio. Other suitable thermosetting polyesters are STYPOL polyesters which are commercially available from Cook Composites and Polymers of Port Washington, Wis. and thermosetting NEOXIL polyesters which are commercially available from DSM B.V. of Como, Italy.

As discussed above, thermoplastic vinyl acetate materials and thermoplastic polyester materials which are compatible with the thermosetting matrix material can also be used as polymeric film-forming materials in the present invention. Non-limiting examples of useful thermoplastic vinyl acetate polymers include RESYN 1971, RESYN 2828 and RESYN 1037 vinyl acetate copolymer emulsions which are commercially available from National Starch, VINOL polyvinyl acetates which are commercially available from Air Products and Chemicals Co. of Allentown, Pa. and other polyvinyl acetates which are commercially available from H. B. Fuller.

Thermoplastic polyesters useful in the present invention include saturated bisphenol A polyesters such as Neoxil 954D which is commercially available from DSM, B.V. of the Netherlands.

Preferably the sizing composition comprises a polyepoxide such as EPON® 880 and a thermosetting polyester material such as RD-847A polyester resin in a ratio of about 1:1 to about 6:1 on a total weight basis.

The amount of polymeric film-forming material can be about 10 to about 90 weight percent of the sizing composition on a total solids basis, and is preferably about 60 to about 80 weight percent.

The sizing composition can additionally include one or more thermoplastic vinyl polymers, such as polyvinyl pyrrolidones, in an amount which does not detrimentally affect the compatibility of the polymeric film forming materials discussed above with the thermosetting matrix material. Examples of suitable polyvinyl pyrrolidones include PVP K-15, PVP K-30, PVP K-60 and PVP K-90, each of which are commercially available from ISP Chemicals of Wayne, N.J. The thermoplastic vinyl polymer is preferably present in an amount of about 0.5 to about 10 weight percent of the sizing composition on a total solids basis.

The amount of film-forming material can be about 1 to about 90 weight percent of the sizing composition on a total solids basis, and is preferably about 60 to about 80 weight percent.

The sizing composition preferably further comprises one or more glass fiber lubricants which are different from the polymeric film-forming materials discussed above. As used herein, the phrase "glass fiber lubricants which are different from the polymeric film-forming materials" means that while the glass fiber lubricants may have film-forming properties, the glass fiber lubricant(s) selected for a particular sizing composition are chemically different from the polymeric film-forming materials included in the same sizing composition.

Useful glass fiber lubricants include cationic, non-ionic or anionic lubricants and mixtures thereof. Generally, the amount of fiber lubricant can be about 1 to about 25 weight percent of the sizing composition on a total solids basis.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

The sizing composition preferably comprises one or more coupling agents selected from the group consisting of organo silane coupling agents, transition metal coupling agents (such as titanium, zirconium and chromium coupling agents), amino-containing Werner coupling agents and mixtures thereof. These coupling agents typically have dual functionality. Each metal or silicon atom has attached to it one or more groups which can react or compatibilize with the glass fiber surface and/or the components of the sizing composition. As used herein, the term "compatibilize" with respect to coupling agents means that the groups are chemically attracted, but not bonded, to the glass fiber surface and/or the components of the sizing composition, for example by polar, wetting or solvation forces. Examples of hydrolyzable groups include:

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include Z-6040 gamma-glycidoxypropyltrimethoxysilane (commercially available from Dow Corning), A-187 gamma-glycidoxypropyltrimethoxysilane, A-174 gamma-methacryloxypropyltrimethoxysilane and A-100 gamma-aminopropyltriethoxysilane silane coupling agents (each of which are commercially available from OSi Specialties, Inc. of Tarrytown, N.Y.).

The amount of coupling agent can be 1 to about 10 weight percent of the sizing composition on a total solids basis. The organo silane coupling agent can be at least partially hydrolyzed with water prior to application to the glass fibers.

Crosslinking materials can also be included in the sizing composition. Non-limiting examples of suitable crosslinkers include melamine formaldehyde and polyamides such as the VERSAMID products which are commercially available from General Mills Chemicals, Inc. The amount of crosslinker can be about 1 to about 5 weight percent of the sizing composition on a total solids basis.

The sizing composition can include one or more emulsifying agents for emulsifying components of the sizing composition. Non-limiting examples of suitable emulsifying agents or surfactants include polyoxyalkylene block copolymers (such as PLURONIC™ F-108 polyoxypropylene-polyoxyethylene copolymer which is commercially available from BASF Corporation of Parsippany, N.J.), ethoxylated alkyl phenols (such as IGEPAL CA-630 ethoxylated octylphenoxyethanol which is commercially available from GAF Corporation of Wayne, N.J.), polyoxyethylene octylphenyl glycol ethers, ethylene oxide derivatives of sorbitol esters and polyoxyethylated vegetable oils (such as EMULPHOR EL-719, which is commercially available from GAF Corp.). Generally, the amount of emulsifying agent can be about 1 to about 30 weight percent of the sizing composition on a total solids basis.

The sizing composition can also include one or more aqueous dispersible or soluble plasticizers to improve flexibility. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. The amount of plasticizer is preferably less than about 5 weight percent of the sizing composition on a total solids basis.

Fungicides, bactericides and anti-foaming materials and organic and/or inorganic acids or bases in an amount sufficient to provide the aqueous sizing composition with a pH of about 2 to about 10 can also be included in the sizing composition. Water (preferably deionized) is included in the sizing composition in an amount sufficient to facilitate application of a generally uniform coating upon the strand. The weight percentage of solids of the sizing composition generally can be about 5 to about 20 weight percent.

Preferred sizing compositions are disclosed in assignee's U.S. Pat. Nos. 3,997,306 and 4,305,742, which are hereby incorporated by reference.

Another preferred sizing composition includes EPON® 880 epoxy resin and RD-847-A polyester resin as the polymeric film forming materials, PVP K-30 polyvinyl pyrrolidone, EMERY® 6717 partially amidated polyethylene imine lubricant, EMULPHOR EL-719 polyoxyethylated vegetable oil, IGEPAL CA-630 ethoxylated octylphenoxyethanol, PLURONIC™ F-108 polyoxypropylene-polyoxyethylene copolymer, SAG 10 anti-foaming material and A-174 functional organo silane coupling agent.

The sizing can be applied in many ways, for example by contacting the filaments with a static or dynamic applicator, such as a roller or belt applicator, spraying or other means. For a discussion of suitable applicators, see *Loewenstein* at pages 165–172, which is hereby incorporated by reference.

The sized filaments are preferably dried at room temperature or at elevated temperatures to remove excess moisture from the filaments and, if present, cure any curable sizing or secondary coating composition components. Drying of glass filament forming packages or cakes is discussed in detail in *Loewenstein* at pages 219–222, which is hereby incorporated by reference. The sizing is typically present on the filaments in an amount ranging from about 0.3 percent to about 1.5 percent by weight after drying.

After drying, the sized glass filaments can be gathered together into bundles or strands 14 of generally parallel filaments or roving and can be further treated with a secondary coating composition which is different from the sizing composition. The secondary coating composition can include one or more of the components of the sizing composition discussed above, and is preferably aqueous-based.

The mat 10 has a mat surface weight greater than about 200 grams per square meter prior to entanglement. Preferably, the mat surface weight ranges from about 250 to about 1500 grams per square meter prior to entanglement.

Referring now to FIG. 1, the overall width of the mat 10 can range from about 0.6 to about 3 meters (about 24 to about 120 inches), and preferably ranges from about 1.2 to about 2.4 meters (about 48 to about 96 inches).

The length of the mat 10 can vary based upon such factors as the desired length of the product to be transported to the customer. The mat is preferably formed by a generally continuous process as discussed below. Preferably, the length of the mat 10 ranges from about 60 to about 300 meters (about 200 to about 1000 feet), and more preferably about 180 to about 275 meters (about 600 to about 900 feet).

Figures 6, 7:
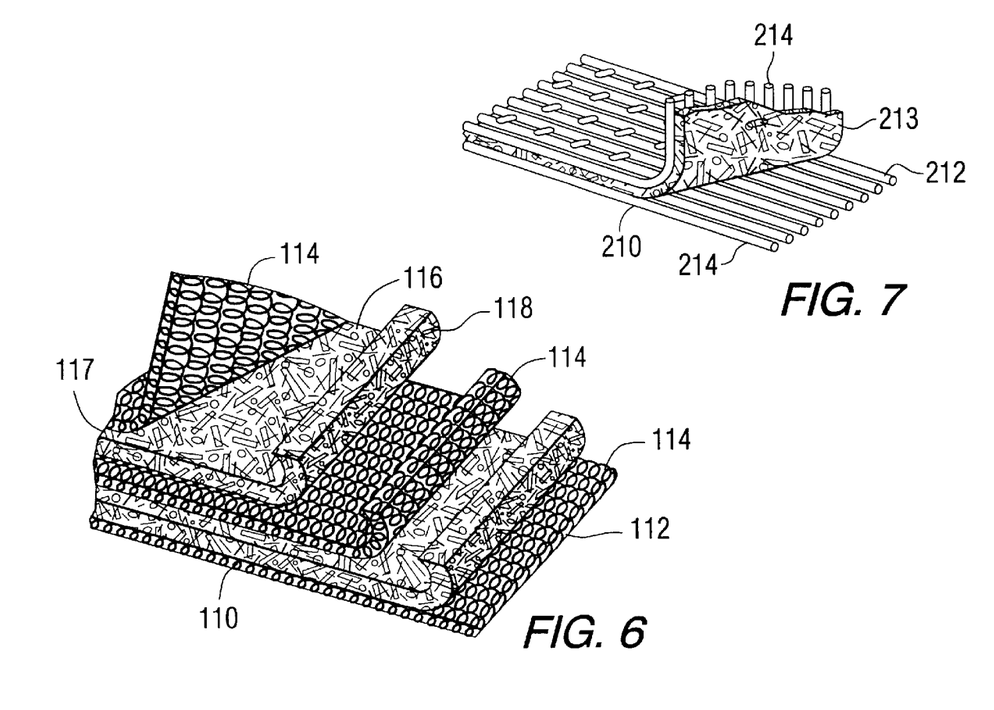
FIG. 6 is an enlarged schematic perspective view of an alternative embodiment of a mat according to the present invention.
FIG. 7 is an enlarged schematic perspective view of another alternative embodiment of a mat according to the present invention.

In an alternative embodiment shown in FIG. 6, the mat 110 can further comprise a plurality of randomly oriented essentially continuous glass fibers 112. As used herein, the phrase "essentially continuous" means that the glass fibers 112 have a mean average length greater than about 10 meters to about 150 kilometers or more. Suitable glass compositions and nominal filament diameters are discussed in detail above. The essentially continuous glass fibers 112 can be formed as one or more layers 114 positioned within the mat 117 having the monofilaments and strands, adjacent the top side 116 and/or adjacent the bottom side 118 of the mat 117.

In another alternative embodiment shown in FIG. 7, the mat 210 can further comprise a plurality of unidirectional essentially continuous glass fiber strands 212 and the mat 213 having the monofilaments and strands according to the present invention as discussed above. As used herein, the term "unidirectional" means that the essentially continuous glass fiber strands 212 are positioned in one or more layers 214 in generally parallel alignment along the longitudinal axis of the mat 213.

Figure 8:
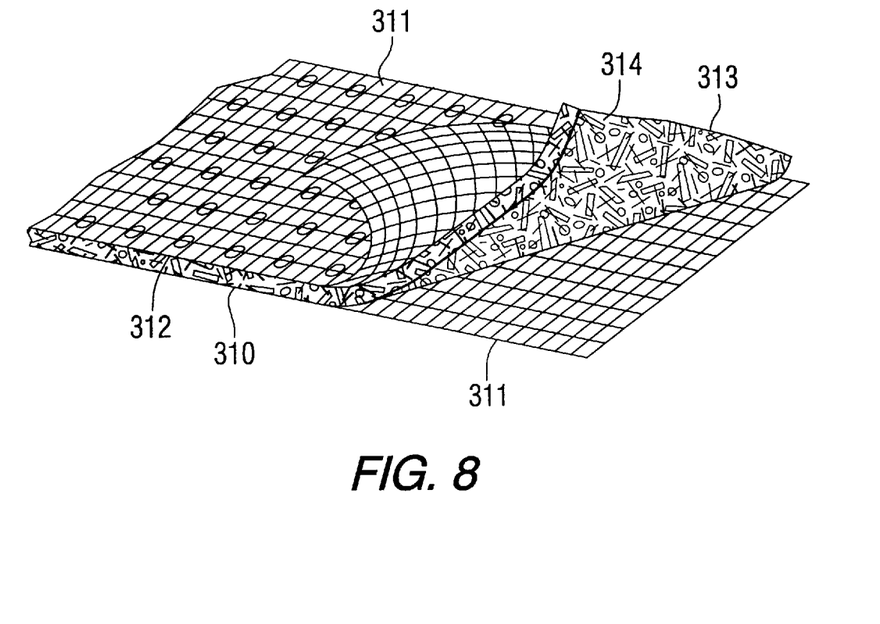
FIG. 8 is an enlarged schematic perspective view of another alternative embodiment of a mat according to the present invention.

In another alternative embodiment shown in FIG. 8, the mat 310 can further comprise one or more fabrics 311 positioned within the mat 313 having the monofilaments and strands, adjacent the top side 312 and/or adjacent the bottom side 314 of the mat 313. The fabric 311 can be formed from glass fibers, thermoplastic fibers and/or thermosetting fibers such as are discussed below. The fabric 311 can be formed as a nonwoven or woven material. A non-limiting example of a suitable nonwoven is a material formed from a slurry of discontinuous or non-continuous fibers. Suitable woven materials include those formed by weaving or knitting.

Figure 9:
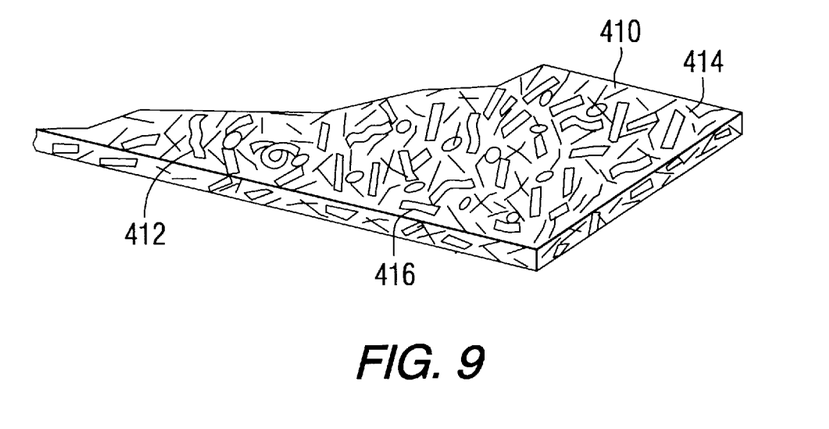
FIG. 9 is an enlarged schematic perspective view of yet another alternative embodiment of a mat according to the present invention.

In another alternative embodiment shown in FIG. 9, the mat 410 further comprises a plurality of generally continuous or discontinuous fibers and/or strands 412 formed from a material selected from the group consisting of thermoplastic materials, thermosetting materials and natural materials, such as cotton or jute, in addition to the glass monofilaments 414 and glass fiber strands 416.

Suitable man-made polymeric fibers can be formed from a fibrous or fiberizable material prepared from natural or synthetic organic polymers. Polymeric fibers believed to be useful in the present invention are discussed at length in the *Encyclopedia of Polymer Science and Technology*, Vol. 6 (1967) at pages 505–712, which is hereby incorporated by reference. As used herein, the term "fiberizable" means a material capable of being formed into a generally continuous filament, fiber, strand or yarn. Suitable man-made fibers include synthetic polymers such as polyamides, polyesters, acrylics, polyolefins, polyurethanes, vinyl polymers, derivatives and mixtures thereof. See *Encyclopedia of Polymer Science and Technology*, Vol. 6 at 506.

Suitable man-made fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507–508.

Non-limiting examples of useful polyamide fibers include nylon fibers, polyhexamethylene adipamide, polyamide-imides and aramids such as KEVLAR™, which is commercially available from E. I. duPont de Nemours, Inc. of Wilmington, Del. Thermoplastic polyester fibers useful in the present invention include those composed of polyethylene terephthalate and polybutylene terephthalate.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology*, Vol. 6 at 559–561.

Useful polyolefin fibers are generally composed of at least 85% by weight of ethylene, propylene, or other olefins. See *Encyclopedia of Polymer Science and Technology*, Vol. 6 at 561–564.

Fibers formed from vinyl polymers believed to be useful in the present invention can be formed from polyvinyl chloride, polyvinylidene chloride, polytetrafluoroethylene, and polyvinyl alcohol.

Further examples of thermoplastic fiberizable materials believed to be useful in the present invention are fiberizable polyimides, polyether sulfones, polyphenyl sulfones; polyetherketones, polyphenylene oxides, polyphenylene sulfides and polyacetals.

It is understood that blends or copolymers of any of the above materials and combinations of fibers formed from any of the above materials can be used in the present invention, if desired.

The polymeric fibers 412 of the mat 410 can comprise about 1 to about 15 weight percent (in the alternative embodiment) of the mat 410 on a total solids basis, and preferably about 1 to about 10 weight percent.

Preferably the mat is essentially free of inorganic fibers other than those discussed above, such as aluminosilicate fibers. As used herein, "essentially free of aluminosilicate fibers" means that the mat contains less than about 5 weight percent and is more preferably free of aluminosilicate fibers.

Referring now to FIGS. 1 and 2, the mat 110 can be treated or coated with an adhesive or polymeric binder material to promote consolidation of the mat prior to or after entanglement, although use of a binder is not preferred. Non-limiting examples of useful polymeric binders include polyvinyl acetate, polyesters and polypropylene. Suitable polymeric binders can be in the form of a powder, fiber or emulsion, as desired. The binders are consolidated with the mat by the application of heat and pressure, such as by passing the mat between heated calendering rolls.

Figure 4:
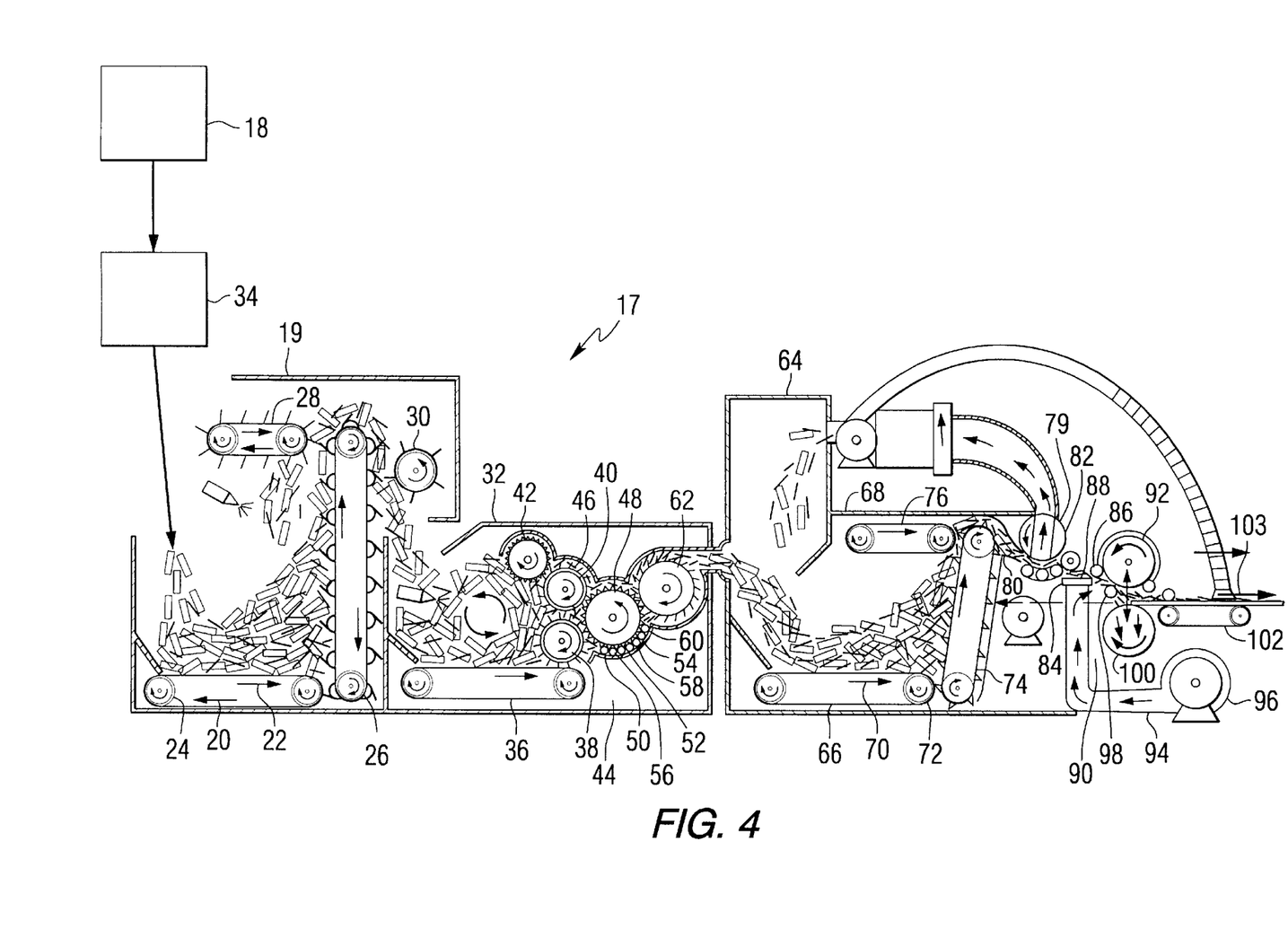
FIG. 4 is a schematic side elevational view of a first portion of a preferred system for forming a mat according to the present invention.

Referring now to FIG. 4, the mat 10 can be formed using a mat forming apparatus, indicated generally at 17, comprising one or more fiber strand supplies 18. Preferably, the strand supply 18 comprises a plurality of forming or supply packages mounted upon a creel. Conventional creels suitable for use in the present invention are shown in *Loewenstein* at page 315, which is hereby incorporated by reference. The supply packages can be wound such that the strand 14 can be withdrawn from the inside of the supply package or from the outside of the supply package (known in the art as "filling wind"). The dimensions of the supply package can vary, depending upon such variables as the diameter and type of fiber wound thereon, and are generally determined by convenience for handling and processing. Generally, supply packages are about 20 to about 30 centimeters in diameter and have a length of about 30 to about 100 centimeters.

In an alternative embodiment, the strand supply 18 comprises a filament forming apparatus which comprises a glass melting furnace or forehearth containing a supply of a filament forming mass or molten glass and having a precious metal bushing or spinneret attached to the bottom of the forehearth. The bushing is provided with a series of orifices in the form of tips through which molten glass is drawn in the form of individual fibers or monofilaments at a high rate of speed. Such filament forming apparatus are well known to those skilled in the art and further discussion thereof is not believed to be necessary in view of the present disclosure. Suitable filament forming apparatus are discussed in *Loewenstein* at pages 22–27 and 119–151, which are hereby incorporated by reference.

The glass filaments can be cooled by spraying with water and coated with a sizing by an applicator as discussed above. After application of the sizing, the glass filaments are gathered by an alignment device which aligns each of the filaments to form one or more strands 14 in which each of the filaments 12 is generally adjacent and coplanar (in side-by-side or generally parallel alignment). Non-limiting examples of suitable alignment devices include rotatable or stationary gathering shoes or a comb, as discussed in *Loewenstein* at page 173, which is hereby incorporated by reference.

Preferably, the number of strands ranges from 1 to about 10 strands and, more preferably, 1 to about 6 strands.

Preferably the strands 14 are formed from generally continuous strands which are chopped by a chopper 34 into discontinuous lengths having a mean average length such as is discussed above. The chopper 34 can be positioned proximate the conveyor 20 such that chopped strands ejected from the chopper 34 are deposited upon the conveyor 20. Alternatively, the strands can be chopped at a location spaced apart from and remote to the mat forming apparatus and transported to the mat forming apparatus.

Preferably the chopper dispenses about 0.5 to about 12 grams of strand 14 per minute per linear millimeter width (about 5 to about 120 ounces per minute per linear foot width). The amount of chopped strand per unit area deposited upon conveyor is also a function of the conveyor speed. A non-limiting example of a suitable chopper 34 is the Model 90 chopper which is commercially available from Finn and Fram, Inc. of California.

The chopped strands preferably have on at least a portion of the surfaces thereof the essentially dried residue of a coating or sizing composition as discussed in detail above.

For supplying synthetic fibers in the alternative embodiment, the fiber forming apparatus can be, for example, a forming device for synthetic textile fibers or strands, the methods and apparatus for which are discussed in detail above.

Also, an antistatic agent for example an amine, amide or quaternary salt such as soyadimethyl and ethylammonium ethosulfate can be applied to the filaments or strands prior to deposition upon the conveyor, if desired.

The mat forming apparatus 17 can also comprise a hopper 19 for collecting the chopped fiber strands 14 received from the fiber strand supply 18. The hopper 19 includes a prefeed conveyor 20 having a surface which is driven in a direction 22 by a pair of spaced drive rollers 24 which are rotated by a motor (not shown). The speed of the prefeed conveyor 20 can range up to about 30 feet per minute. Preferably, the prefeed conveyor 20 is positioned adjacent to an elevating conveyor 26 which includes a plurality of protrusions or pins which facilitate conveying of the strands 14. The speed of the elevating conveyor 26 can range up to about 300 feet per minute.

A stripper 28 removes excess strands 14 from the elevating conveyor 26. The speed of the stripper 28 preferably ranges up to about 300 feet per minute. A doffer roll 30 positioned adjacent a portion of the elevating conveyor 26 on a side opposite the hopper 19 meters the strands 14 being discharged from the elevating conveyor 26 for feeding the strands at an essentially uniform rate to a strand opener 32. The doffer roll 30 preferably rotates at about 300 to about 500 revolutions per minute (rpm). The stripper 28 and doffer roll 30 can partially open or filamentize a relatively small percentage of the strands 14, generally less than about 5 weight percent.

A preferred apparatus having a suitable hopper 19, conveyors 20, 26, stripper 28 and doffer roll 30 is commercially available from Rando, Inc. of Macedon, N.Y. as the RANDO PREFEEDER, part of the MODEL B RANDO-WEB® processor. See "From Bale to Nonwoven Web in one Continuous Operation", a publication of Rando, Inc. (September 1990) at pages 4–5, which are hereby incorporated by reference. Other suitable conveyors are well known to those skilled in the art.

As shown in FIG. 4, the strand opener 32 receives the chopped strand 14 from the conveyor 26 and doffer roll 30. Preferably the strand opener 32 comprises a conveyor 36 which feeds the chopped strand 14 to a pair of opposed wire cloth rolls 38, 40 and a mating stripper roll 42, which causes the strand 14 to circulate in the hopper 44 and at least partially opens or filamentizes the strand 14. The partially opened strand 46 passes between the rolls 38, 40 to the main roll 48, which engages a plurality of small metallic clothed rolls 50, 52 and 54 and corresponding stripper rolls 56, 58 and 60. The rolls 38, 40 preferably rotate at a speed of about 100 to about 200 rpm. The metallic clothed rolls 50, 52 and 54 and corresponding stripper rolls 56, 58 and 60 preferably rotates at a speed of up to about 30 rpm. The partially opened strand 46 is doffed from the main roll 48 by a doffer roll 62 which transports the partially opened strand 46 to a strand feeder 64.

The percentage of strand 14 filamentized can be adjusted by adjusting the tolerances between the mating rolls of the strand opener 32, the rotational speed of the rolls and conveyors and by the selection of components for the coating composition and loss on ignition of the coating composition on the glass. The filamentization can also be controlled by using different coating compositions having different adhesive properties on separate portions of the glass supply. As discussed in detail above, preferably at least about 30 weight percent of the strand 14 in the mat is filamentized.

A preferred strand opener 32 is a RANDO-OPENER BLENDER, part of the MODEL B RANDO-WEB® processor discussed above.

Alternatively, the strand opener 32 can be a carding machine, such as are commercially available from Hollingsworth on Wheels, Inc. of Greenville, S.C. or N. Schlumberger (USA) Inc. of Charlotte, N.C.

The strand feeder 64 is positioned to receive the partially opened strands 46 from the doffer roll 62. The partially opened strands 46 drop onto a conveyor 66 within the hopper 68 of the strand feeder 64. The conveyor 66 has a surface which is driven in a direction 70 by a pair of spaced drive rollers 72 which are rotated by a motor (not shown). The speed of the conveyor 66 preferably ranges up to about 30 feet per minute. Preferably, the conveyor 66 is positioned adjacent to an elevating conveyor 74 and stripper 76 configured similarly to the conveyors 20, 26 and stripper 28 discussed above.

A preferred strand feeder 64 is a RANDO-FEEDER, part of the MODEL B RANDO-WEB® processor discussed above.

The partially opened strands 46 are conveyed to a mat former 79 by an air stream 80 to deposit upon the surface of a driven cylindrical vacuum condenser screen 82 maintained at a pressure below atmospheric pressure, such as about 0.24 to about 1.49 kPa. The condenser screen 82 preferably rotates at a speed up to about 30 rpm. The preformed mat 88 is formed upon the screen 82 and doffed onto the feed plate 84 and under the feed roll 86. The rotational speed of the condenser screen 82 is synchronized with the rotational speed of the feed roll 86 by synchronizing the respective drives. The feed roll 86 preferably rotates at a speed up to about 10 rpm.

The feed roll 86 feeds the preformed mat 88 into a concave surface of a nose bar 90 which exerts a holding action as the preformed mat 88 is fed over the nose bar 90 and individual strands 14 and monofilaments 12 are combed from the performed mat 88 by the lickerin 92. The lickerin 92 preferably rotates at a speed of up to about 3500 rpm. The strands 14 and monofilaments 12 are introduced into an air stream 94 generated by a fan 96. The velocity of the air stream 94 is controlled by adjusting a saber 98 which is set in eccentric bushings. The strands 14 and monofilaments 12 are deposited in the form of mat 10 upon the surface of a driven cylindrical vacuum condenser screen 100 at an angle 101 of about 90° to a plane 103 tangent to the surface of the vacuum condenser screen 100 and which is maintained at a pressure below atmospheric pressure, such as about 0.24 to about 1.49 kPa.

A preferred mat former 79 is a RANDO-WEBBER® having a J-type cover, part of the MODEL B RANDO-WEB® processor discussed above.

The mat 10 is conveyed from the mat former 79 to an entanglement device or needler 104 by a conveyor 102. Any conventional conveyor, such as a chain or mesh conveyor, can be used to transport the mat 10 from the mat former 79 to the needler 104.

Prior to entanglement, the mat 10 can be combined with unidirectional glass, thermoplastic or thermosetting fiber strands and/or fabrics such as are discussed above. The unidirectional strands can be fed from a creel having a plurality of supply packages to align the unidirectional strands in generally parallel and coplanar alignment. The unidirectional strands and/or fabric can be positioned between layers of the mat 10 or adjacent the top side 116 or bottom side 118 of the mat, as desired.

Figure 5:
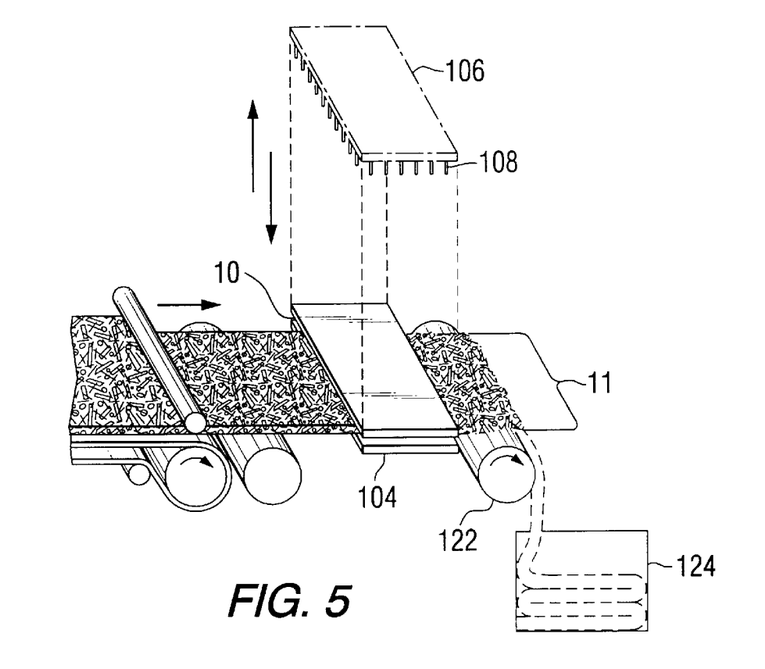
FIG. 5 is a schematic perspective view of a second portion of the preferred system for forming a mat according to the present invention.

Referring now to FIG. 5, the glass monofilaments 12 and glass fiber strands 14 of the mat 10 preferably are entangled by needling the glass monofilaments 12 and glass fiber strands 14 (and any unidirectional strands or fabric, if present) together. The needling can be accomplished by passing the mat 10 through a needler 104 between generally known spaced needling boards 106, such as are disclosed in assignee's U.S. Pat. No. 4,277,531, which is hereby incorporated by reference. Alternatively, portions of the glass monofilaments 12 and glass fiber strands 14 can be entangled by hydro-entangling.

A plurality of spaced needles 108 are used to entangle or intertwine the monofilaments 12 and strands 14 of the mat 10 to impart mechanical strength and integrity to the mat 10. The needles 108 are constructed and arranged with a barb which entangles the monofilaments 12 and strands 14 contained in the mat 10 as the barb passes through the mat forming aperture on the downward stroke of the vertical reciprocation of the needles and preferably release the monofilaments 12 and strands 14 contained within the mat 10 during the upward stroke of the reciprocating needler 104. Alternatively, needles with reverse barbs can be used to form the mat 10 of the present invention.

As used herein, the term "horizontal(ly)" means that the direction of movement is generally parallel with respect to ground. As used herein, the terms "vertical(ly)", "downwardly" and "upwardly" refer to direction of movement which is generally perpendicular with respect to ground.

During vertical upward movement, the needles 108 are passed through a plurality of generally cylindrical orifices in a metal stripper plate (not shown for clarity in the drawings) which rests upon the mat 10 during its passage through the needler 104. The filaments 12 and strands 14 are thus pulled from the surface of the barb as the mat 10 proceeds in horizontal direction after a stroke of the needle 108 in a downward and upward direction. The mat 10 passes over a metal bed plate having a plurality of generally cylindrical orifices therethrough aligned with the orifices of the stripper plate through which the needles 108 pass on the downward stroke of the needleboard 106.

The needleboard 106 can be reciprocated such that a full stroke (downward and upward motion) occurs in a period of about 100 to about 1000 strokes per minute and upon completion of each reciprocation rolls are provided in association with the needler 104 to move the mat 10 in generally horizontal direction in preparation for the successive downward stroke of the needleboard. A non-limiting example of a suitable needling machine is Model NL 9 which is commercially available from Textilmaschinenfabrik Dr. Ernest Fehrer AG of Germany.

The length of the needle 108, the depth of the penetration of the needle 108 through the mat 10 during its passage through the needler 104 and the extent to which the filaments 12 and strands 14 entangled 13 in the barb of the needle 108 are moved in a generally vertical upward direction through the mat 10 during the upward stroke of the needler 104 determine the extent to which impact strength can be imparted to the composite 120 (shown in FIG. 3) incorporating the mat 10 as reinforcement.

Preferably, the gauge of the needle 108 ranges from about 32 to about 19 gauge, with a combination of 25 and 32 gauge needles being preferred. The punch density is preferably about 6 to about 47 punches per square centimeter (about 40 to about 300 punches per square inch).

The punching depth or degree of penetration of the needles 108 into the orifices of the bed plate preferably ranges from about 8 to about 18 millimeters (about 0.2 to about 0.7 inches). In a typical needling process, the mat 10 entering the needler 104 can have an overall average thickness of about 8 to about 100 millimeters. After passage throughout the needler 104, the mat 10 can have a compressed overall average thickness of about 2.5 to about 25 millimeters (about 0.1 to about 1 inches). The needling process is described in further detail in assignee's U.S. Pat. No. 4,335,176, which is hereby incorporated by reference.

The surface weight of the mat 10 after needling can range from about 200 to about 1200 grams per square meter. The overall width 11 of the mat 10 can range from about 0.6 to about 3 meters (about 24 to about 120 inches), and preferably ranges from about 1.2 to about 2.4 meters (about 48 to about 96 inches).

An advantage of such a mat is that it can be readily handled after formation and packaged in a convenient form for transportation to a customer.

For example, as shown in FIG. 5, the mat 10 can be rolled to form a roll 122 or festooned or severed into predetermined lengths and packaged in a conventional container 124 of suitable dimensions for shipment to the customer.

Figure 3:
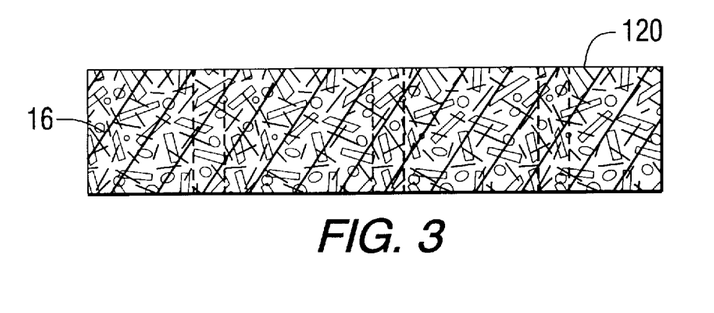
FIG. 3 is an enlarged schematic cross sectional view of a composite according to the present invention.

The mat 10 can be used to reinforce a thermosetting matrix material 16 in a vacuum molding process to form a polymeric composite 120. Non-limiting examples of suitable vacuum molding processes include closed cavity bag molding and resin injection recirculating molding.

Suitable vacuum molding processes are disclosed in U.S. Pat. Nos. 5,052,906; 5,316,462; and 5,439,635, which are hereby incorporated by reference. A preferred closed bag vacuum molding process is disclosed in U.S. Pat. No. 4,902,215, which is hereby incorporated by reference. In a vacuum molding process, single cavity mold containing the dry or wet mat lay-up is covered by a flexible sheet, liner or bag. The edges of the sheet are clamped against the mold to form a sealed chamber, the liquid thermosetting matrix is introduced into the chamber and a vacuum is applied to the interior of the chamber to collapse the flexible sheet against the mat to press and cure the resin impregnated mat. The vacuum pressure applied to the chamber during molding can range from about 67 to about 101 kiloPascals (about 20 to about 30 inches of mercury) for about 1 hour at a temperature of about 25° C.

Thermosetting matrix materials 16 useful in the present invention can include vacuum-molding compatible thermosetting polyesters, vinyl esters, epoxides, aminoplasts and mixtures thereof. Preferably the thermosetting matrix material is a polyester or vinyl ester.

Suitable thermosetting polyesters include the AROPOL products which are commercially available from Ashland Chemical Inc. of Columbus, Ohio. Examples of useful vinyl esters include DERAKANE® products such as DERAKANE® 470-45 and 411, which are commercially available from Dow Chemical USA of Midland, Mich.

Useful epoxies are discussed in detail above. Examples of suitable commercially available epoxies are EPON® 826 and 828 epoxy resins, which are epoxy functional polyglycidyl ethers of bisphenol A prepared from bisphenol-A and epichlorohydrin and are commercially available from Shell Chemical.

Other components which can be included with the thermosetting matrix material 16 and reinforcing mat 10 in the composite 120 are, for example, colorants or pigments, lubricants or process aids, ultraviolet light (UV) stabilizers, antioxidants, other fillers, and extenders.

The temperature, pressure and curing time for the thermosetting matrix material depends upon such factors as the type of thermosetting matrix material used, other additives in the matrix system and thickness of the composite, to name a few.

A method according to the present invention for making a mat adapted to reinforce a thermosetting matrix material will now be described generally.

With reference to FIGS. 4 and 5, the method generally comprises the initial step of mixing a plurality of glass monofilaments 12 with a plurality of glass fiber strands 14 to form an essentially uniform mixture as discussed above. The mixture of glass monofilaments 12 and glass fiber strands 14 is dispensed onto the collector or conveyor to form a mat 10 such as is discussed in detail above.

The monofilaments 12 and glass fiber strands 14 of the mat 10 are entangled by needling the monofilaments 12 and glass fiber strands 14 together to form the mat 10. Suitable needlers and the methods for needling are discussed in detail above.

A method according to the present invention for reinforcing a vacuum moldable thermosetting matrix material to form a reinforced composite will now be described generally. The method generally comprises the initial step of coating and impregnating at least a portion of the mat discussed above with the thermosetting matrix material by applying a vacuum to a side of the reinforcing mat opposite a supply of vacuum moldable thermosetting matrix material to distribute the thermosetting matrix material essentially uniformly throughout the reinforcing mat. The thermosetting matrix material is at least partially cured to form a reinforced thermoset composite, as discussed above.

The present invention will now be illustrated by the following specific, non-limiting example.

EXAMPLE

A mixture of DE through M filament glass fiber strands, each strand having about 100 to about 800 fibers, coated with a variety of sizing compositions including saturated and unsaturated polyester, polyvinyl acetate and epoxy film-forming materials, were chopped into lengths of about 25 to about 76 millimeters (about 1 to about 3 inches) in a manner similar to that discussed above in the specification. The weight of sizing composition on the fibers after drying at a temperature of about 132° C. (270° F.) for about 12 hours (loss on ignition) was about 1.1 weight percent. These fibers were used to form a mat according to the present invention, as discussed below.

The mat was prepared from the above glass fiber strands using the MODEL B RANDO-WEB® processor as discussed above. The mat was needled using a Morrison needler having 25 gauge needles at a punch density of about 12.4 punches per square centimeter (about 80 punches per square inch) to a depth of about 14 millimeters (about 0.55 inches). The mat had a mat surface weight of about 640 grams per square meter (about 2.1 ounces per square foot), a thickness of about 6.35 millimeters (about 0.250 inches), and about 50 percent monofilaments on a total solids basis.

The mat of Example A was trimmed to about 305 millimeters (about 12 inches) width and about 305 millimeters (about 12 inches) length, stacked into two layers and vacuum molded in accordance with U.S. Pat. No. 4,9025,215 into a composite with General Purpose polyester thermosetting matrix material (commercially available from Ashland) using a vacuum molding process which is commercially available from TPI Composites of Rhode Island. The composite of Example A contained about 15.9 weight percent glass on a total solids basis. The composites were molded at a temperature of about 25° C. and pressure of about 67 to about 101 kiloPascals (about 20 to about 30 inches of mercury) for about 1 hour to form composite plaques of about 305 millimeters (about 12 inches) width and about 305 millimeters (about 12 inches) length.

The mat of Example B was vacuum molded under similar conditions, except that the thermosetting matrix material was DERAKANE® 411 vinyl ester, which is commercially available from Dow Chemical USA of Midland, Mich. The resulting composite contained about 18.0 weight percent glass on a total solids basis.

Each plaque was evaluated for: tensile strength in the machine direction and cross-machine direction according to ASTM Method D-638-82a; flexural strength and flexural modulus in the machine direction and crossmachine direction according to ASTM Method D-790-81; and short beam strength in the machine direction and cross-machine direction according to ASTM Method D-2344-84. The results of these evaluations are set forth in Table 1.

As shown in Table 1, the results of physical property testing of the above samples indicate that vacuum molded composites including the mats of the present invention have good physical properties including but not limited to tensile, flexural and short beam shear strength and tensile and flexural modulus.

TABLE 1

|  | EXAMPLE A | EXAMPLE B |
| --- | --- | --- |
| TENSILE STRENGTH | | |
| machine direction | | |
| (kpsi) | 9.35 | 4.42 |
| (MPa) | 64.5 | 30.5 |
| cross-machine direction | | |
| (kpsi) | 9.19 | 5.46 |
| (MPa) | 63.4 | 37.7 |

TABLE 1-continued

|  | EXAMPLE A | EXAMPLE B |
| --- | --- | --- |
| FLEXURAL STRENGTH | | |
| machine direction | | |
| (kpsi) | 13.90 | 7.42 |
| (MPa) | 95.9 | 51.2 |
| cross-machine direction | | |
| (kpsi) | 13.60 | 9.16 |
| (MPa) | 93.8 | 63.2 |
| TANGENT FLEXURAL MODULUS | | |
| machine direction | | |
| (Mpsi) | 0.725 | 0.636 |
| (GPa) | 5.0 | 4.4 |
| cross-machine direction | | |
| (Mpsi) | 0.672 | 0.708 |
| (GPa) | 4.6 | 4.9 |
| SHORT BEAM SHEAR STRENGTH | | |
| machine direction | | |
| (psi) | 1.11 | 1.36 |
| (kPa) | 0.15 | 0.18 |
| cross-machine direction | | |
| (psi) | 1.14 | 1.23 |
| (kPa) | 0.15 | 0.16 |

The mats of the present invention provide stiffness and thickness to a composite and, when used as a surface layer in combination with reinforcement mats and/or fabrics to form a composite, have a resin-rich surface which provides good hydrolysis and ultraviolet radiation resistance. The mats of the present invention are useful as reinforcements for composite applications such as boat hulls, light poles, utility poles and support pilings.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A vacuum molding-compatible mat adapted to reinforce a thermosetting matrix material in a vacuum molded composite, the mat comprising:

(a) a plurality of glass monofilaments present in an amount ranging from at least about 10 weight percent to about 99 weight percent of the mat on a total solids basis, the plurality of glass monofilaments having a mean average length ranging from about 5 to about 150 millimeters and having a filament coating composition applied to at least a portion of surfaces of the glass monofilaments, the filament coating composition being compatible with a thermosetting matrix material for forming a vacuum molded composite; and (b) a plurality of glass fiber strands, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the thermosetting matrix material for forming the vacuum molded composite;

wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands.

2. The mat according to claim 1, wherein the filament coating composition comprises a polymeric film-forming material which is selected from the group consisting of thermosetting materials, vinyl acetate materials and thermoplastic polyester materials.

3. The mat according to claim 1, wherein the filament coating composition is present upon the surfaces of the monofilaments as an essentially dried residue.

4. The mat according to claim 1, wherein the strand coating composition comprises a polymeric film-forming material which is selected from the group consisting of thermosetting materials, vinyl acetate materials and thermoplastic polyester materials.

5. The mat according to claim 1, wherein the strand coating composition is present upon the surfaces of the glass fiber strands as an essentially dried residue.

6. The mat according to claim 1, wherein the filament coating composition is different from the strand coating composition.

7. The mat according to claim 1, wherein the filament coating composition is the same as the strand coating composition.

8. The mat according to claim 1, wherein the glass monofilaments are present in an amount ranging from about 40 weight percent to about 90 weight percent of the mat on a total solids basis.

9. The mat according to claim 1, wherein the glass monofilaments are present in an amount ranging from about 50 weight percent to about 70 weight percent of the mat on a total solids basis.

10. The mat according to claim 1, wherein the glass fiber strands are present in an amount ranging from about 1 weight percent to about 70 weight percent of the mat on a total solids basis.

11. The mat according to claim 1, wherein at least a portion of the glass monofilaments are entangled with at least a portion of the glass fiber strands by needling the portions together.

12. The mat according to claim 11, wherein the glass monofilaments and the glass fiber strands are needled together at a punch density ranging from about 6 to about 47 punches per square centimeter.

13. The mat according to claim 1, wherein at least a portion of the glass monofilaments are entangled with at least a portion of the glass fiber strands by hydro-entangling the portions together.

14. The mat according to claim 1, wherein the mat surface weight ranges from about 200 to about 1200 grams per square meter.

15. The mat according to claim 1, wherein the mat further comprises a plurality of randomly oriented essentially continuous glass fibers.

16. The mat according to claim 1, wherein the mat further comprises a plurality of unidirectional essentially continuous glass fibers.

17. The mat according to claim 1, wherein the mat further comprises a fabric.

18. The mat according to claim 17, wherein the fabric comprises glass fibers.

19. The mat according to claim 1, wherein the mat further comprises fibers formed from a material selected from the group consisting of thermoplastic materials, thermosetting materials and natural materials.

20. The mat according to claim 1, wherein the thermosetting matrix material comprises a thermosetting film-forming material selected from the group consisting of thermosetting polyesters, vinyl esters, epoxides, phenolics, aminoplasts, thermosetting polyurethanes, derivatives and mixtures thereof.

21. A reinforced polymeric vacuum molded composite comprising:
(a) a vacuum moldable thermosetting matrix material; and
(b) a reinforcing mat comprising:
 (1) a plurality of glass monofilaments present in an amount ranging from at least about 10 weight percent to about 99 weight percent of the mat on a total solids basis, the plurality of glass monofilaments having a mean average length ranging from about 5 to about 150 millimeters and having a filament coating composition applied to at least a portion of surfaces of the glass monofilaments, the filament coating composition being compatible with a vacuum moldable thermosetting matrix material for forming a vacuum molded composite; and
 (2) a plurality of glass fiber strands, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the vacuum moldable thermosetting matrix material for forming the vacuum molded composite;
wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands.

22. The composite according to claim 21, wherein the thermosetting matrix material comprises a thermosetting film-forming material selected from the group consisting of thermosetting polyesters, vinyl esters, epoxides, phenolics, aminoplasts, thermosetting polyurethanes, derivatives and mixtures thereof.

23. A method for making a mat adapted to reinforce a vacuum moldable thermosetting matrix material in a vacuum molded composite, the method comprising the steps of:
(a) mixing a plurality of glass monofilaments with a plurality of glass fiber strands to form an essentially uniform mixture, the glass monofilaments comprising about 10 to about 99 weight percent of the mixture on a total solids basis, the glass monofilaments having a mean average length ranging from about 5 to about 150 millimeters and having a filament coating composition applied to at least a portion of surfaces of the glass monofilaments, the filament coating composition being compatible with a vacuum moldable thermosetting matrix material for forming a vacuum molded composite, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the vacuum moldable thermosetting matrix material for forming the vacuum molded composite;

(b) dispensing the mixture onto a collector to form a mat having a mat surface weight greater than about 200 grams per square meter; and (c) entangling the glass monofilaments with the glass fiber strands of the mat.

24. A method for reinforcing a vacuum moldable thermosetting matrix material to form a vacuum molded composite, the method comprising the steps of:

(a) coating and impregnating at least a portion of a reinforcing mat with a vacuum moldable thermosetting matrix material by applying a vacuum to a side of the reinforcing mat opposite a supply of vacuum moldable thermosetting matrix material to distribute the thermosetting matrix material essentially uniformly throughout the reinforcing mat, the reinforcing mat comprising:

(1) a plurality of glass monofilaments present in an amount ranging from at least about 10 weight percent to about 99 weight percent of the mat on a total solids basis, the plurality of glass monofilaments having a mean average length ranging from about 5 to about 150 millimeters and having a filament coating composition applied to at least a portion of surfaces of the glass monofilaments, the filament coating composition being compatible with the vacuum moldable thermosetting matrix material for forming a vacuum molded composite; and (2) a plurality of glass fiber strands, each glass fiber strand having at least about 100 generally parallel glass fiber monofilaments, the plurality of glass fiber strands having a mean average length ranging from about 5 to about 150 millimeters and having a strand coating composition applied to at least a portion of surfaces of the glass fiber strands, the strand coating composition being compatible with the vacuum moldable thermosetting matrix material for forming the vacuum molded composite;

wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands; and (b) at least partially curing the thermosetting matrix material to form a reinforced composite.

* * * * *